United States Patent

Drewes

(10) Patent No.: US 8,967,339 B2
(45) Date of Patent: Mar. 3, 2015

(54) BRAKE DISC ARRANGEMENT FOR DISC BRAKES

(75) Inventor: Olaf Drewes, Aschaffenburg (DE)

(73) Assignee: SAF-Holland GmbH, Bessenbach (DE)

(*) Notice: Subject to any disclaimer, the term of this patent is extended or adjusted under 35 U.S.C. 154(b) by 239 days.

(21) Appl. No.: 13/130,695

(22) PCT Filed: Dec. 4, 2009

(86) PCT No.: PCT/EP2009/066416
§ 371 (c)(1),
(2), (4) Date: Aug. 1, 2011

(87) PCT Pub. No.: WO2010/063831
PCT Pub. Date: Jun. 10, 2010

(65) Prior Publication Data
US 2011/0278115 A1 Nov. 17, 2011

(30) Foreign Application Priority Data
Dec. 4, 2008 (DE) .......................... 10 2008 044 339

(51) Int. Cl.
*F16D 65/12* (2006.01)
*F16D 65/02* (2006.01)

(52) U.S. Cl.
CPC ...... *F16D 65/123* (2013.01); *F16D 2065/1316* (2013.01); *F16D 2065/1328* (2013.01); *F16D 2065/1344* (2013.01); *F16D 2065/136* (2013.01); *F16D 2250/0007* (2013.01)
USPC ..................... 188/218 XL; 188/17; 188/18 A

(58) Field of Classification Search
CPC ................ F16D 65/128; F16D 65/123; F16D 2065/1392
USPC ................... 188/218 XL, 17, 18 A
See application file for complete search history.

(56) References Cited

U.S. PATENT DOCUMENTS

| 4,026,393 A | 5/1977 | Gebhardt et al. |
| 5,520,269 A * | 5/1996 | Yamamoto et al. ..... 188/218 XL |
| 2004/0173418 A1 * | 9/2004 | Saame et al. ................... 188/17 |

FOREIGN PATENT DOCUMENTS

| DE | 4437331 A1 * | 2/1996 |
| DE | 19929390 A1 | 1/2001 |
| DE | 10103639 A1 | 8/2002 |
| DE | 10227529 | 1/2004 |
| DE | 10322454 A1 | 2/2004 |
| DE | 102004008958 A1 | 9/2005 |
| DE | 102006043945 A1 | 3/2008 |
| DE | 102007001211 A1 * | 7/2008 |

(Continued)

OTHER PUBLICATIONS

European Search Report.

*Primary Examiner* — Thomas Irvin
*Assistant Examiner* — Mahbubur Rashid
(74) *Attorney, Agent, or Firm* — Price Heneveld LLP

(57) ABSTRACT

A brake disc arrangement for disc brakes, in particular for land vehicles, including a friction ring, an attachment adapter for attaching the brake disc arrangement to a wheel hub, and at least one connection element for connecting the friction ring and the attachment adapter, wherein the attachment adapter comprises a fastening area in which the connection element is stationarily fixed, and wherein the friction ring comprises a receptacle area in which the connection element is accommodated such that the friction ring can move radially relative to the connection element.

12 Claims, 6 Drawing Sheets

(56) References Cited

FOREIGN PATENT DOCUMENTS

| | | | |
|---|---|---|---|
| DE | 102008042173 A1 * | 3/2010 | |
| EP | 0198217 A1 | 10/1986 | |
| EP | 1122456 A1 | 8/2001 | |
| EP | 1227261 A2 | 1/2002 | |
| EP | 1972823 A1 | 6/2007 | |
| GB | 1032923 | 6/1966 | |
| JP | 2006336851 | 12/2006 | |
| JP | 2010106916 A * | 5/2010 | |
| WO | WO 2010031634 A1 * | 3/2010 | |

* cited by examiner

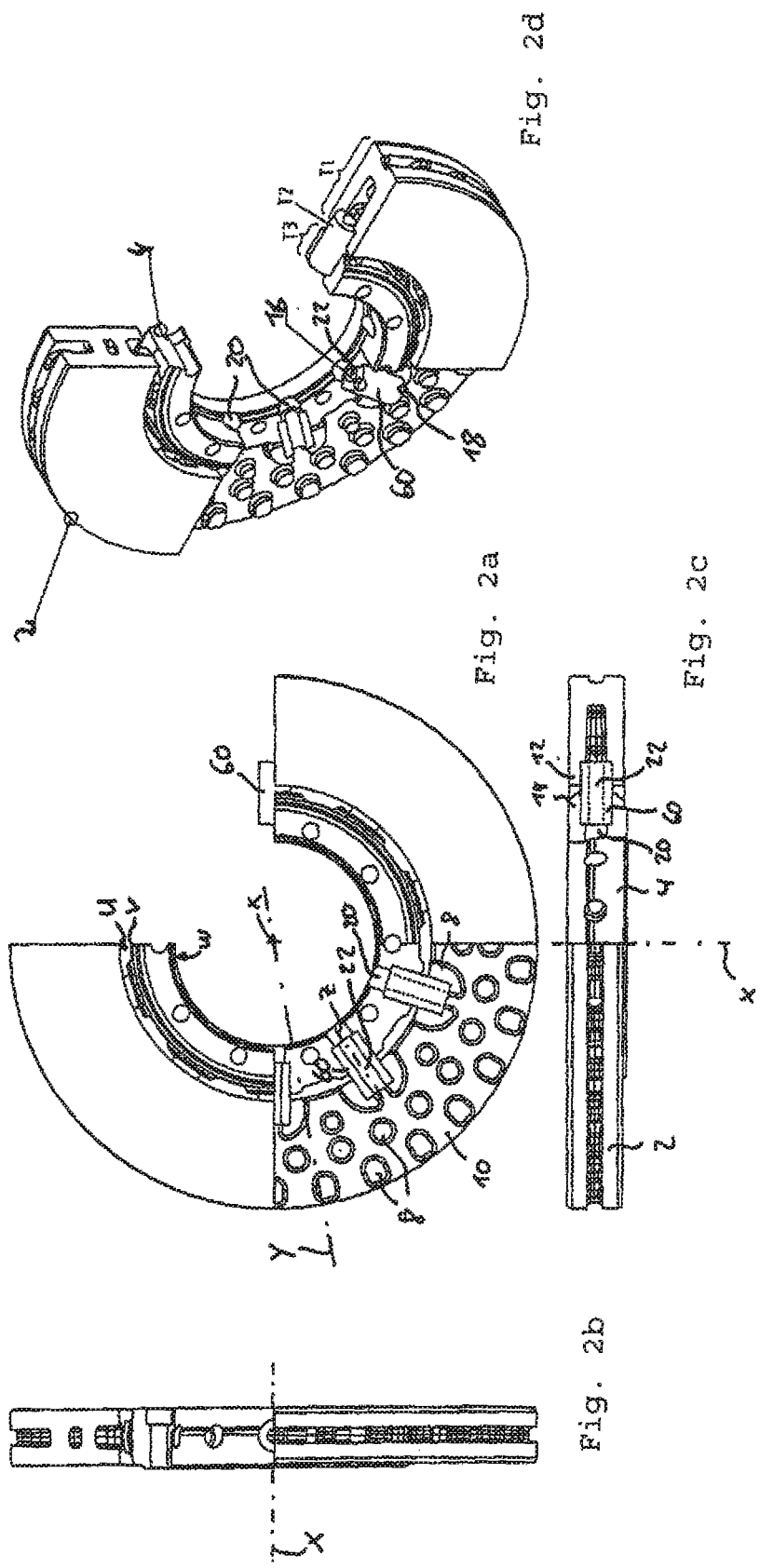

BRAKE DISC ARRANGEMENT FOR DISC BRAKES

BACKGROUND OF THE INVENTION

The present inventions relates to a brake disc arrangement for disc brakes, for example of land vehicles (such as passenger cars, trucks, commercial vehicles or trailers), as well as a method of manufacturing a brake disc arrangement for disc brakes, also in particular for land vehicles.

Brake disc arrangements of the type in question are known from the prior art. For example, DE 199 29 390 discloses a brake disc arrangement for disc brakes, in which a friction ring is cast onto a toothed adapter so that the brake disc may expand radially and, thus, a ballooning of the disc is avoided, which due to the uneven distribution of stresses might cause the disc to fracture. A problem of such arrangements, however, is that much manufacturing work is necessary since punching burrs have to be removed. Moreover, the known brake disc arrangement is very complex to cast since the brake disc arrangement, due to the different ways of casting its elements, has to be manufactured in two different foundries, which results in competence problems and costly and time-consuming logistics.

Thus, the object underlying the present invention is to provide a brake disc arrangement for disc brakes, in particular for land vehicles, as well as a method of manufacturing a brake disc arrangement for disc brakes, in particular for land vehicles, by means of which it is possible to improve the operational safety of the brake disc arrangement and to simplify the manufacturing process as well as to reduce the manufacturing costs.

SUMMARY OF THE INVENTION

According to the invention, there is provided a brake disc arrangement for disc brakes, in particular for land vehicles, comprising a friction ring, an attachment adapter for attaching the brake disc arrangement to a wheel hub, and at least one connection element for connecting the friction ring and the attachment adapter, wherein the attachment adapter comprises a fastening area in which the connection element is stationarily fixed, and wherein the friction ring comprises a receptacle area in which the connection element is accommodated such that the friction ring is radially movable on or relative to the connection element, respectively. Expediently, the brake disc arrangement is therefore intended for brake discs, the friction ring of which is designed either solidly (i.e. without ventilation ducts or a circulation space, respectively) or as an internally ventilated friction ring (with a circulation space or ventilation ducts, respectively). In particular, the brake disc arrangement serves for attachment to land vehicles, such as passenger cars, trucks, trailers, tractor-trailers or the like, but is not to be limited to this list. The brake disc arrangement is designed to be fixed indirectly or directly with the wheel or a wheel hub so that it revolves together with the wheel. Brake linings, which are provided in a brake caliper spanning the friction ring, may be pressed towards the friction ring from both sides in order to slow down the wheel. Expediently, the brake disc arrangement further comprises an attachment adapter designed to attach the brake disc arrangement to a wheel hub. The attachment may be done indirectly via intermediate elements or directly on the wheel hub. As a matter of course, the attachment adapter may comprise a pot-shaped section, which is connected to the wheel or the wheel hub. The attachment adapter may also be a part of the wheel hub itself. Furthermore, there is provided at least one connection element for connecting the friction ring and the attachment adapter. The connection element, thus, is designed to connect the friction ring and the attachment adapter such that axially (i.e. in the direction of the axis of rotation of the brake disc arrangement) and in the circumferential direction of rotation of the brake disc arrangement they are not at all or only minimally movable relative to each other in order to transmit forces from the friction ring to the attachment adapter. The friction ring and the attachment adapter, thus, are designed as separate parts such that they are essentially separated from each other by a ring gap and connected to one another merely by the at least one connection element, a first end or first section of which engages with the attachment adapter, and a second end or second section of which engages with the friction ring. To this end, the attachment adapter comprises a fastening area, in which the connection element is stationarily fixed. In particular, the fastening area in the attachment adapter may be designed as a recess in the attachment adapter extending radially to the axis of rotation of the brake disc arrangement.

The first end of the connection element is stationarily fixed in the fastening area of the attachment adapter such that— even in the case of great temperature influences—a (preferably radial) movement of the connection element relative to the attachment adapter is not possible. Expediently, the friction ring comprises a receptacle area, in which the connection element is accommodated such that the friction ring is radially movable on or relative to the connection element. The receptacle area of the friction ring may be designed as a recess extending from the inner circumference of said friction ring and protruding radially into it. Here, the second section or second end or the opposite section or end of the connection element, respectively, is accommodated or embedded, respectively, such that a relative movement between the connection element and the friction ring is possible in the radial direction of the brake disc arrangement. To put it differently, the connection element and the friction ring are connected to one another such that no movement or only very little movement between the connection element (and thus the attachment adapter) and the friction ring is allowed in the axial direction or in the circumferential direction of rotation of the brake disc arrangement. However, it is possible for the friction ring to slide or move in the radial direction of the brake disc arrangement or in the longitudinal direction of or parallel to or along the longitudinal axis of the connection element, respectively. This effect is made possible or increased in particular during the braking process due to the different temperature levels in the brake disc arrangement. Here, the friction ring has the highest temperature, followed by the temperature of the connection element and that of the attachment adapter, wherein the lowest temperature is that of the attachment adapter. Consequently, the friction ring expands more than the connection element so that in the receptacle area a gap forms between the second end of the connection element and the friction ring, which gap permits a free sliding or movement in the radial direction. Since the connection element is hotter than the attachment adapter, it expands more in the fastening area than the attachment adapter so that the connection between the connection element and the attachment adapter gets even stronger due to an increased press fit during the braking process. Particularly advantageously, the connection element is made of a different material than the attachment adapter and the friction ring. Particularly expediently, the friction ring is made of a cast material, such as gray cast iron, or a ceramic material. The attachment adapter may also be made of a cast material, preferably gray cast iron, and particularly advantageously it is made of the same material as the friction ring. Expediently, the connection element is made of steel or the like. Thus, by means of the brake disc arrangement according to the invention it is made sure that the—very hot—friction ring may freely expand radially and, thus, ballooning is prevented, which significantly contributes to improving the operational safety of the brake disc arrangement.

Expediently, there is provided a plurality of connection elements, which preferably are evenly arranged along the circumference of the attachment adapter. Here, the connection elements may be arranged along the outer circumference of the attachment adapter or along the inner circumference of the friction ring, respectively. In order to be able to optimally distribute the forces between the friction ring and the attachment adapter, it is particularly preferred that the plurality of the connection elements are evenly distributed in the circumferential direction. Particularly expediently, eight to twelve connection elements are provided. Particularly preferably, ten connection elements are provided. In motor vehicles, it is particularly advantageous if the same number as fastening elements for wheels or a multiple thereof is provided, i.e. for example five wheel studs, five, ten or fifteen connection elements.

Preferably, the friction ring and the attachment adapter are arranged essentially concentrically around the axis of rotation of the brake disc arrangement. To put it differently, the friction ring and the attachment adapter are arranged relative to each other such that the friction ring at least partially surrounds or encloses the attachment adapter. Particularly preferably, the receptacle area of the friction ring and the fastening area of the attachment adapter are arranged essentially in a plane perpendicular to the axis of rotation of the brake disc arrangement. To put it differently, the receptacle area of the friction ring and a corresponding fastening area of the attachment adapter may be arranged along a radial line of the brake disc arrangement.

Preferably, the connection element is designed as an elongate body, the longitudinal axis of which preferably is perpendicular to the axis of rotation of the brake disc arrangement. As a matter of course, the connection element, however, does not necessarily have to have a length larger than the extension in the cross-sectional direction. Preferably, the longitudinal axis of the connection element is perpendicular to the axis of rotation of the brake disc arrangement. To put it differently, the longitudinal axis of the connection element is essentially parallel to a radial line of the brake disc arrangement or is aligned or identical with it, respectively.

Particularly preferably, the connection element is designed at least partially as a cylindrical body, which preferably has a round, in particular circular cross-section. Thus, the connection element, along its longitudinal axis or longitudinal extension, respectively, is designed as a cylindrical body, at least partially, preferably entirely. Here, the connection element may have a round, expediently a circular cross-section. Here, the cross-section is essentially perpendicular to the longitudinal axis or longitudinal extension, respectively, of the connection element. Consequently, the connection element may have an oval or circular shape in cross-section. Particularly preferably, the cross-sectional shape of the connection element is circular, at least in the area where it is arranged in the friction ring and attachment adapter, since it is thus possible to simplify the assembly process in a multi-stage casting process. As a matter of course, the cross-section of the connection element may also have any other angular or cornered configuration, for example, it may be four-cornered, rhombic, triangular or polygonal.

Expediently, the connection element is designed at least partially as a body tapering towards the friction ring. Thus, the connection element may be designed along its entire longitudinal extension or only along a partial area as a body tapering towards the friction ring or as a conical body, respectively. To put it differently, the connection element tapers departing from the attachment adapter in the direction of the friction ring. Particularly advantageously, the taper may be designed as a constant or linear taper. As a matter of course, the decrease in cross-section in the longitudinal direction of the connecting element may also be non-constant or non-linear. Here, the taper may be provided only in the area of the attachment to the friction ring. For example, next to the tapering area, which is provided in the area of attachment to the friction ring, there may be provided a cylindrical area with constant cross-section, which preferably is again followed by an area tapering towards the attachment adapter so that a kind of double cone is formed.

In a preferred embodiment, the connection element is designed as a hollow body. Thus, the connection element may be designed either as a solid body or as a hollow body. In case the connection element is designed as a hollow body, it may expediently be designed as a kind of sleeve or jacket and, thus, has a through hole along the longitudinal extension of the connection element.

Expediently, the connection element comprises at least one recess extending in the direction of its longitudinal axis, which recess ends in a bottom section of the connection element. Thus, the recess may be designed as an opening or cavity so that the connection element particularly advantageously is cup-shaped. The cross-section—perpendicular to the longitudinal axis of the connection element—may have any shape, however, particularly advantageously, it has the same cross-sectional configuration as the outer cross-section of the connection element. Particularly expediently, the cross-section of the recess is round, in particular circular. The relationship of the cross-sectional area of the recess to the connection element (cross-sectional area of the connection element including the recess) is at least 0.25, preferably about at least 0.4, and particularly preferably about at least 0.6. The depth of the recess (in the direction of the longitudinal axis) advantageously is about at least 0.35, preferably about at least 0.6, and particularly preferably at least about 0.85 of the entire longitudinal extension of the connection element. In an advantageous embodiment, the thickness of the bottom section (in the direction of the longitudinal axis) is about the same as the wall thickness of the circumferential surface of the connection element.

Advantageously, the connection element is arranged such that the recess opens towards the friction ring or attachment adapter. To put it differently, the recess extends from the friction ring into the connection element or from the attachment adapter into the connection element, respectively. In a configuration, in which the recess opens towards the attachment adapter, the recess may be entirely filled by the material of the attachment adapter. Alternatively, it is possible that the recess is not filled by the material of the attachment adapter, wherein particularly expediently there is provided a radial through opening to the inner circumference of the attachment adapter. Further alternatively, the material of the attachment adapter may at least partially extend into the recess. Corresponding alternative solutions may be provided in case the recess opens towards the friction ring so that the material of the friction ring expediently does not extend into the recess, wherein in such an embodiment particularly advantageously there is provided a circulation connection between the circulation space of the friction ring and the recess. This configuration leads to an optimized cooling of the brake disc due to an enlarged surface at the connection elements.

Particularly advantageously, the connection element comprises two recesses, which extend from the opposite end faces of the connection element into said connection element. Thus, the two recesses are essentially arranged opposite each other. In this case, the recesses may end in a common bottom section. The recesses may be identical as far as their depths and cross-sections are concerned, however, advantageously they are designed differently, so that the recess departing from the friction ring extends deeper into the connection element than the second recess, which departs from the attachment adapter.

Preferably, the bottom section is provided in that area of the connection element which corresponds to the gap between the friction ring and the attachment adapter, wherein the bottom section preferably at least partially—in the radial direction of the brake disc arrangement—overlaps with the respective edge regions of the friction ring and the attachment adapter. To put it differently, the connection element may be designed essentially solidly in the area of the gap or annular gap between the friction ring and the attachment adapter, wherein the solid area of the connection element expediently extends somewhat or slightly into the friction ring and the attachment adapter in the radial direction of the brake disc arrangement. By this, it is made sure that the area of the connection element which is subject to greatest shear forces is designed sufficiently steady, wherein due to the recesses the amount of material used may be reduced and the temperature transferred into the wheel hub may be minimized by providing a larger surface area for heat dissipation.

Preferably, the bottom section of the connection element has a through opening extending preferably essentially in the direction of the longitudinal axis so that preferably a connection between the room formed by the recess and the inner circumference of the attachment adapter and/or a circulation space of the friction ring is provided. The through opening may have any cross-sectional configuration. Expediently, the relationship of the cross-sectional area of the through opening to the connection element is about <0.25, preferably about <0.15, and particularly preferably about <0.08.

Expediently, the attachment adapter comprises a radial opening which extends from the inner circumference of the attachment adapter to its fastening area, in which the connection element is fastened. Thus, the opening extends essentially along a radial direction or line relative to the axis of rotation of the brake disc arrangement. Here, the opening may have any cross-sectional shape, however, expediently, it is round or circular. Here, the opening may be concentric relative to the hollow space of the connection element. Such an opening expediently improves the heat balance of the friction ring or keeps the temperature level in the connection element lower during the braking process since air may circulate therein.

Further expediently, the friction ring is designed as an internally ventilated friction ring, wherein preferably the hollow space of the connection element designed as a hollow body communicates with the circulation space of the friction ring. Expediently, an internally ventilated friction ring consists of two ring-shaped discs which are connected by bars such that a circulation space forms between the two discs. This space expediently communicates with the hollow space of the connection element designed as hollow body such that air may flow through the hollow space of the connection element into the circulation space. By this, the removal of heat from all components of the brake disc arrangement is further improved.

Preferably, the connection element has an anchoring area, preferably provided with recesses or projections, in order to provide for an engagement with the fastening area of the attachment adapter. By this, the stationary connection of the connection element and the attachment adapter is further improved due to the positive locking when the connection element is cast in the attachment adapter or the attachment adapter is cast around the first end of the connection element.

The invention also provides a method of manufacturing a brake disc arrangement for disc brakes, in particular for land vehicles, in which a friction ring and an attachment adapter are separated from each other by an annular gap and connected to one another by at least one connection element, one end of which is accommodated stationarily in a fastening area of the attachment adapter, and the other end of which is accommodated radially movable in a receptacle area of the friction ring, comprising the steps: manufacturing a foundry core, arranging the foundry core in a casting mold such that a first chamber corresponding to the friction ring and a second chamber corresponding to the attachment adapter is formed, arranging at least one connection element in a room connecting both chambers, and filling molten metal into the casting mold.

The method according to the invention for manufacturing the brake disc arrangement may comprise various steps depending on the materials used.

In the case of an internally ventilated brake disc, in which the friction ring and the attachment adapter (adapter) are made from the identical material, advantageously the following steps are provided:

- The connection elements are included in the core, and thus pre-positioned, when making the core.
- If necessary, the core package with the connection elements is provided with founder's black to avoid that the friction ring subsequently fuses with the connection elements.
- The core package with the connection elements is put into a casting mold, preferably a sand-casting mold.
- Then, the friction ring and the adapter are manufactured together in one casting step and they are deburred and cleaned.
- Finally, the entire brake disc (friction ring and adapter) is mechanically worked.

In the case of an internally ventilated brake disc, in which the friction ring and the attachment adapter (adapter) are made from different materials, particularly advantageously the following steps may be provided:

- If the friction ring is cast before the adapter (e.g. when the adapter is made from aluminum having a lower melting point), the connection elements are included in the core and, thus, pre-positioned, when making the core.
- If necessary, the core package with the connection elements is provided with founder's black to avoid that the friction ring subsequently fuses with the connection elements.
- The core package with the connection elements is put into a casting mold, preferably a sand-casting mold.
- Then, the friction ring is cast, preferably by sand casting.
- After the casting process, the friction ring is deburred and cleaned.
- The cast and unworked friction ring including the connection elements is put into the casting mold, preferably sand casting, for the adapter. Since the adapter and the connection elements need not be movable relative to each other, the step of applying additional founder's black before casting the adapter may possibly be omitted.

Then, the adapter is cast as well as deburred and cleaned.

Finally, the entire brake disc (friction ring and adapter) is mechanically worked.

If the adapter is cast before the friction ring, the connection elements are put into the casting mold, preferably sand casting, for the adapter.

The adapter is cast and then deburred and cleaned.

The adapter with the connection elements is integrated in the core when making the core for the ventilation duct of the brake disc.

The core package with the adapter and the connection elements is provided with founder's black, if necessary, in order to avoid that the friction ring subsequently fuses with the connection elements.

The core package with the adapter and the connection elements is put into a casting mold, preferably sand casting, for the friction ring.

Then, the friction ring is cast, preferably in a sand casting process, and deburred and cleaned.

Finally, mechanical working of the entire brake disc (friction ring and adapter).

If the brake disc is designed solidly, it may be manufactured as has been described above, however, it is not necessary to provide a core.

As a matter of course, all further features and advantages of the brake disc arrangement according to the invention may also be employed in the methods according to the invention for manufacturing a brake disc arrangement.

Further advantages and features of the present invention become evident from the following description of preferred, exemplary embodiments with reference to the appended figures, wherein individual features of individual embodiments may be combined to form new embodiments.

BRIEF DESCRIPTION OF THE DRAWINGS

The figures show:

FIG. 2a is a partially cross-sectional top plan view of a second preferred exemplary embodiment of the brake disc arrangement according to the invention;

FIG. 2b is an elevational view of a first side of the second embodiment of the brake disk arrangement;

FIG. 2c is an elevational view of a second side of the second embodiment of the brake disk arrangement;

FIG. 2d is a partial cross-sectional perspective view of the second embodiment of the brake disk arrangement;

DETAILED DESCRIPTION OF PREFERRED EMBODIMENTS

Figure 1D:
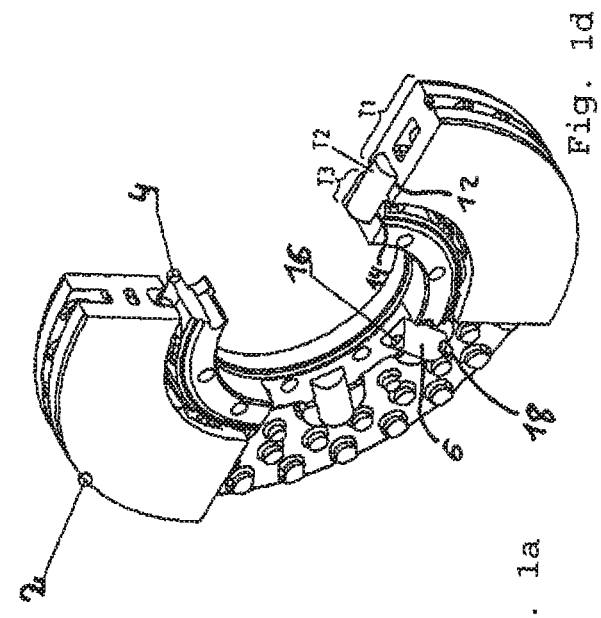
FIG. 1d is a partial cross-sectional perspective view of the first embodiment of the brake disk arrangement.
Figure 1B:
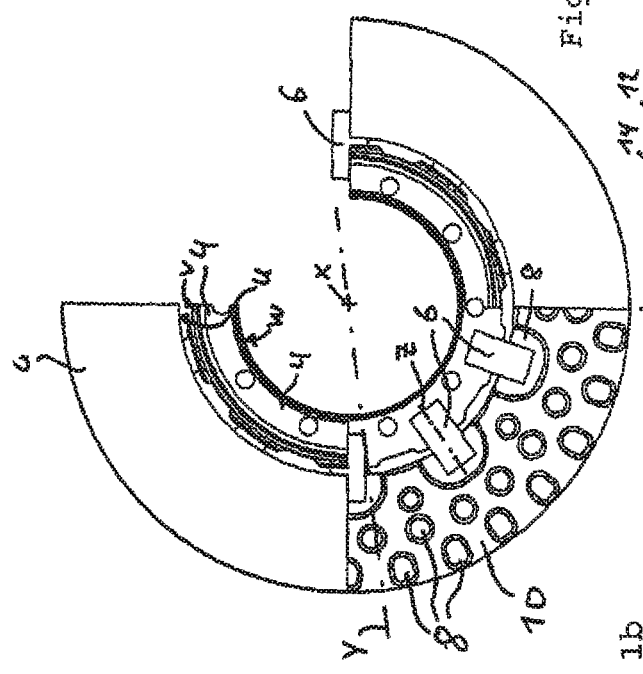
FIG. 1b is an elevational view of a first side of the first embodiment of the brake disk arrangement.
Figure 1C:
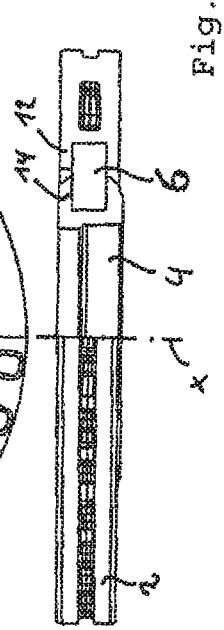
FIG. 1c is an elevational view of a second side of the first embodiment of the brake disk arrangement.
Figure 1A:
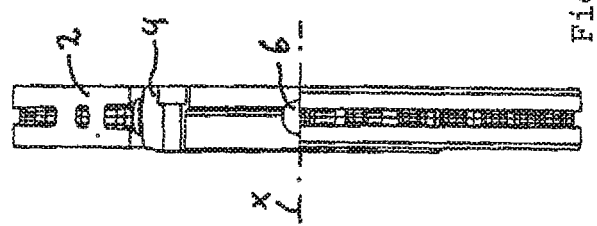
FIG. 1a is a partially cross-sectional top plan view of a first preferred exemplary embodiment of the brake disc arrangement according to the invention.

For purposes of description herein, the terms "upper," "lower," "right," "left," "rear," "front," "vertical," "horizontal," and derivatives thereof shall relate to the invention as oriented in FIGS. 1a-1d. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The first preferred exemplary embodiment of the brake disc arrangement according to the invention depicted in FIGS. 1a-1d shows a friction ring 2, an attachment adapter 4 as well as a plurality of connection elements 6. Via the axis of rotation X the brake disc arrangement is indirectly or directly attached to a wheel or a wheel hub and, consequently, together with the wheel of the vehicle revolves around the axis of rotation X.

In the embodiment shown, the friction ring 2 is designed as an internally ventilated friction ring and, thus, consist of two ring-shaped discs, which are connected to one another by a plurality of bars 8 such that a circulation space 10 forms. As a matter of course, the friction ring 2 may also be designed as a solid body without a circulation space.

The friction ring 2 comprises a receptacle area 12 so as to accommodate the connection element 6. The receptacle area 12 extends from the inner circumference U of the friction ring in the radial direction Y of the brake disc arrangement into the friction ring 2.

The attachment adapter 4 is shown ring-shaped and may be an integral part of a wheel hub. The attachment adapter 4, however, serves at least for indirectly or directly attaching the brake disc arrangement to the wheel hub or the wheel. In order to fasten the connection element 6 in the attachment adapter 4, said adapter comprises a fastening area 14. The fastening area 14 extends from the outer circumference V of the attachment adapter 4 in the radial direction Y into the adapter.

The friction ring and the attachment adapter are manufactured by a casting process, for example from gray cast iron. Particularly advantageously, the friction ring 2 and the attachment adapter 4 are made of the same material.

In the embodiment shown, a plurality of connection elements 6 is provided. The connection elements 6 serve for connecting the friction ring 2 and the attachment adapter 4. To this end, the connection elements 6 are stationarily fastened in the attachment adapter 4 such that they are not movable relative to the the attachment adapter 4, at least not in the radial direction Y. In particular, a first end 16 of the connection element 6 is rigidly embedded in the attachment adapter 4. The opposite or opposed second end 18 of the connection element 6 is accommodated in the receptacle area 12 of the friction ring 2 such that the friction ring 2 is radially movable on or relative to the connection element 6. Consequently, due to the high temperature, the friction ring 2 may freely expand during the braking process since it is supported radially freely movable on the connection elements 6.

This is additionally favored due to the different coefficients of expansion of the friction ring 2, the attachment adapter 4 and the connection element 6. The friction ring 2 exhibits the highest temperature T1 during the braking process, followed by the temperature T2 of the connection element 6, and again followed by the temperature T3 of the attachment adapter 4, which is smaller than the temperatures T1 and T2. Consequently, the friction ring 2 expands the most during the braking process so that a small gap forms between the connection element 6 and the friction ring 2. Since the connection element 6, however, exhibits a higher temperature T2 than the attachment adapter 4, it expands more in relation to the attachment adapter 4 so that there is a tight fit between the first end 16 of the connection element 6 and the fastening area 14 of the attachment adapter 4.

In FIGS. 2a-2d, a further preferred exemplary embodiment of a brake disc arrangement according to the invention is shown, wherein identical elements are denoted with the same reference signs. In contrast to the embodiment shown in FIGS. 1a-1d, the brake disc arrangement according to FIGS. 2a-2d allows for an improvement of the heat balance of the friction ring 2. This is made possible in that, at the inner circumference W of the attachment adapter 4, openings 20 are provided which, in the radial direction Y, extend up to the fastening areas 14 of the attachment adapter 4.

In the fastening area 14, there are provided connection elements 60 which are designed as hollow bodies having a hollow space 22 extending in the radial direction Y. At the second end 18 of the connection element 60, the hollow space 22 ends in the receptacle area 12 of the friction ring 2 such that it communicates with the circulation space 10. This makes it possible that air may flow between the inside of the hub through the opening 20 and the hollow space 22 into the circulation space 10, which again contributes to improving the operational safety due to an optimized heat balance of the brake disc arrangement.

Figure 3:
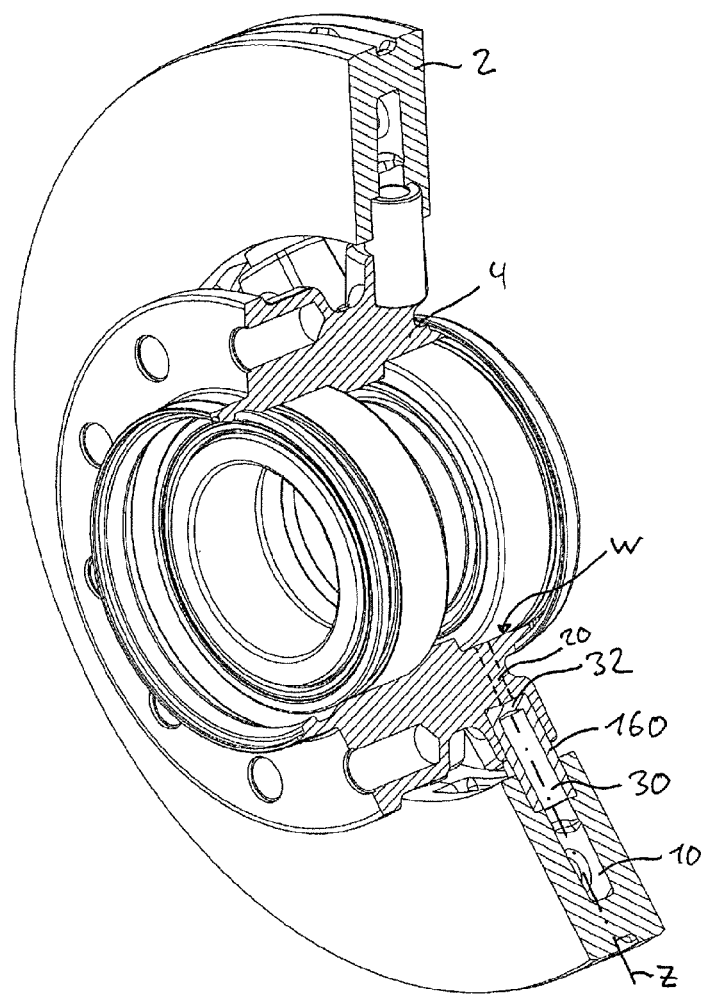
FIG. 3 is a cross-sectional perspective view of a third preferred, exemplary embodiment of the brake disc arrangement according to the invention.

FIG. 3 shows a further preferred exemplary embodiment of the brake disc arrangement according to the invention, wherein identical elements are denoted with the same reference signs. In this embodiment, the connection element 160 is designed with a first recess 30, which ends in a bottom section 32 of the connection element 160. The bottom section 32 may comprise a through opening 34 (FIG. 4), which by means of a radial opening 20 (shown in dashed lines) is connected to the inner circumference W of the attachment adapter 4 or ends there, respectively.

Figure 4:
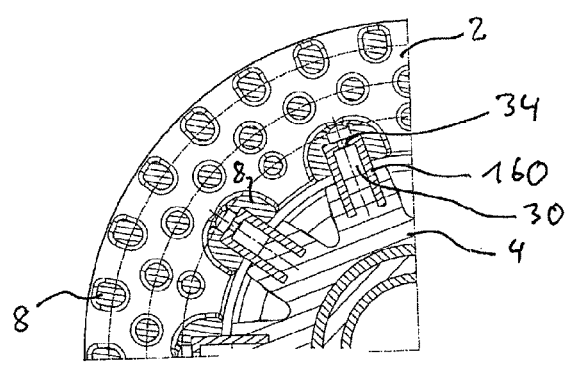
FIG. 4 is a cross-sectional side view of a fourth preferred embodiment of the brake disc arrangement according to the invention.

FIG. 4 depicts a further preferred exemplary embodiment of the brake disc arrangement according to the invention, wherein identical elements are denoted with the same reference signs. In the embodiment shown, the connection element 160 is arranged such that the first recess 30 opens towards the attachment adapter 4. To put it differently, the first recess 30 extends from the attachment adapter 4 into the connection element 160. The hollow space formed by the first recess 30 communicates with the circulation space 10 of the friction ring 2 via the through opening 34. To this end, the bar 8 of the friction ring 2, in which the connection element 160 is arranged at least partially, comprises an expediently radial through hole or opening so that an air exchange (and thus a heat exchange) between the circulation space 10 and the recess 30 becomes possible.

Figure 5:
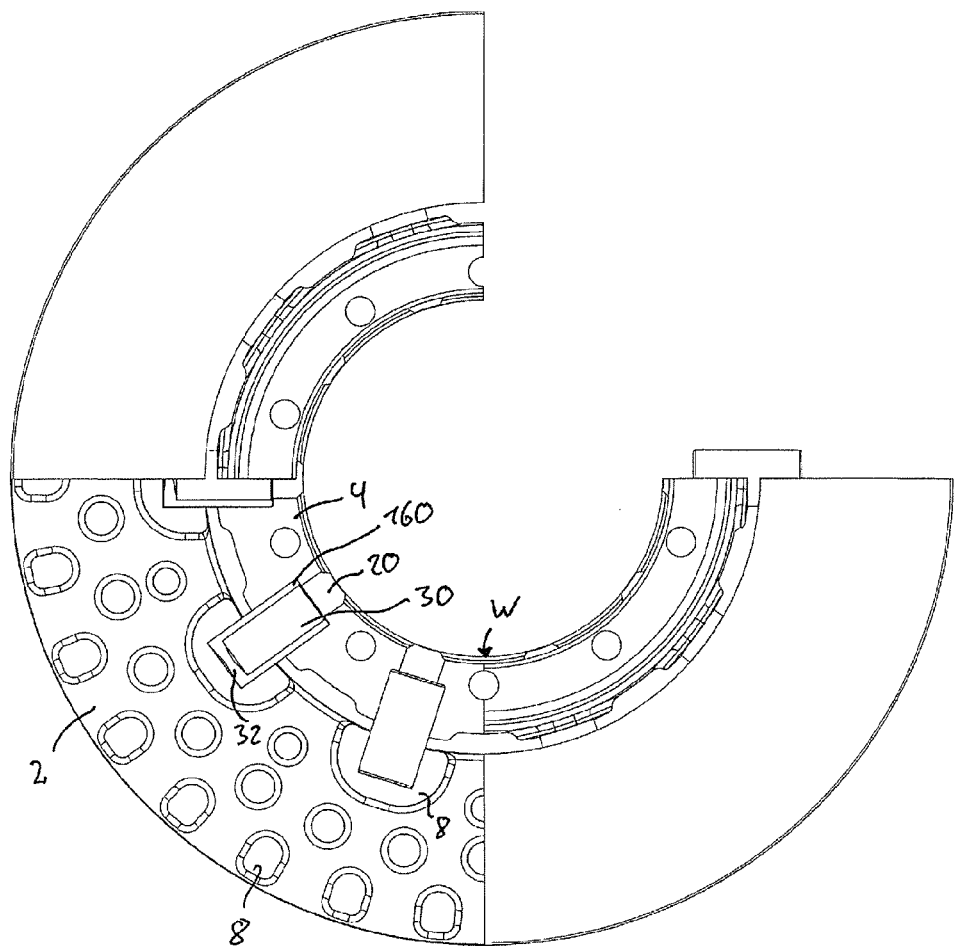
FIG. 5 is a partial cross-sectional side view of a fifth preferred embodiment of the brake disc arrangement according to the invention.

FIG. 5 shows a further preferred exemplary embodiment of a brake disc arrangement according to the invention, wherein identical elements are denoted with the same reference signs. In this embodiment, the radial opening 20 of the attachment adapter 4 ends in the first recess 30 of the connection element 160. By this, it is particularly advantageously possible to optimize the cooling of the brake disc, since the surface area provided for heat transfer at the connection elements 160 is enlarged. As is the case in the embodiment shown in FIGS. 2a-2d, the connection elements 160 do not completely extend up to the inner circumference W of the attachment adapter 4.

Figure 6:
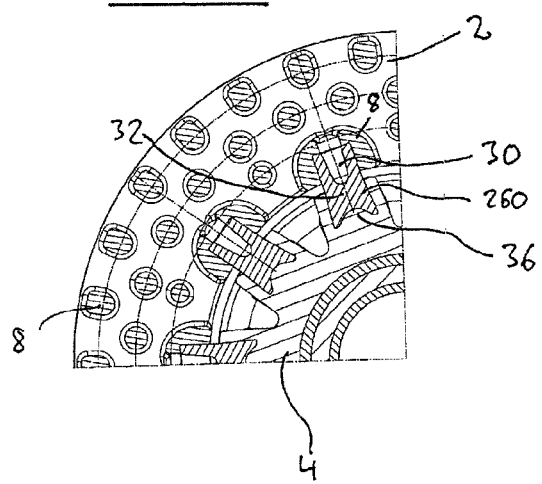
FIG. 6 is a cross-sectional side view of a sixth preferred embodiment of the brake disc arrangement according to the invention.

FIG. 6 depicts a further preferred exemplary embodiment of the brake disc arrangement according to the invention, wherein identical elements are denoted with the same reference signs. The connection element 260 comprises two recesses, i.e. a first recess 30 and a second recess 36, which extend into the connection element 260 from its opposite end faces. Expediently, the two recesses 30, 36 end in a common bottom section 32.

The bottom section 32 of the connection element 6, 60, 160, 260 may be provided such that said connection elements are provided or arranged in (radial) height or section of the gap formed between the friction ring 2 and the attachment adapter 4. Particularly advantageously, the bottom section slightly projects somewhat (in the radial direction) into the respective edge regions of the friction ring 2 and the attachment adapter 4 so that a connection element is created which is particularly secure against shearing.

Figure 7:
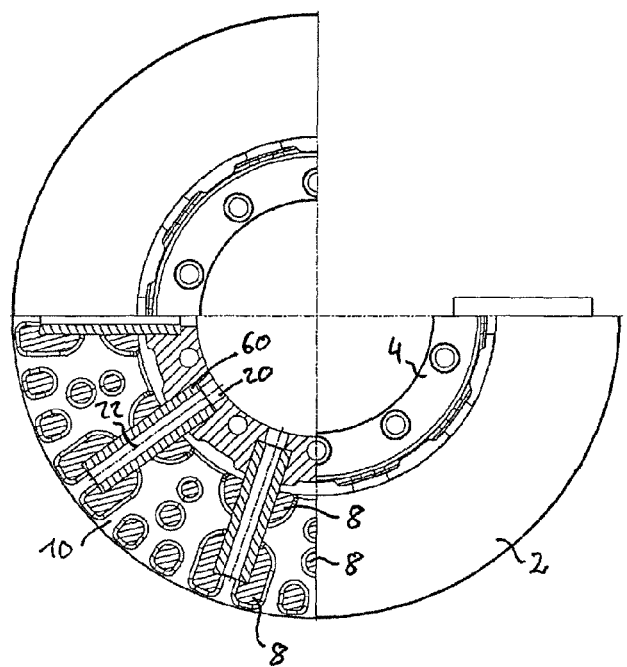
FIG. 7 is a cross-sectional side view of a further preferred embodiment of the brake disc arrangement according to the invention.

FIG. 7 depicts a further preferred exemplary embodiment of the brake disc arrangement according to the invention, wherein identical elements are denoted with the same reference signs. As can be seen, the connection element 60 extends nearly up to the outer circumference of the friction ring 2 into said friction ring. To put it differently, the connection element 60 may extend in the radial direction preferably about at least half into the friction ring 2. Particularly preferably, the connection element 60 extends into the friction ring 2 by about 0.2-0.8 times of the radial extension of the friction ring 2, preferably by about 0.3-0.8 times of the radial extension of the friction ring 2. The connection element 60 also may extend up to the outer circumference of the friction ring 2. Advantageously, however, the connection element 60 does not extend up to the outer circumference of the friction ring 2, but is set back or spaced therefrom (towards the inside). At the respective areas facing the inner circumference and the outer circumference of the friction ring 2, the connection element 60 expediently is enclosed by bars 8 made from material of the friction ring 2. As can be seen, said bars 8 are not connected to one another so that a middle section of the connection element 60 provided in the area of the friction ring 2 is not surrounded by material of the friction ring 2. As a result, an improved radial expansion of the friction ring 2 is ensured.

Figure 8:
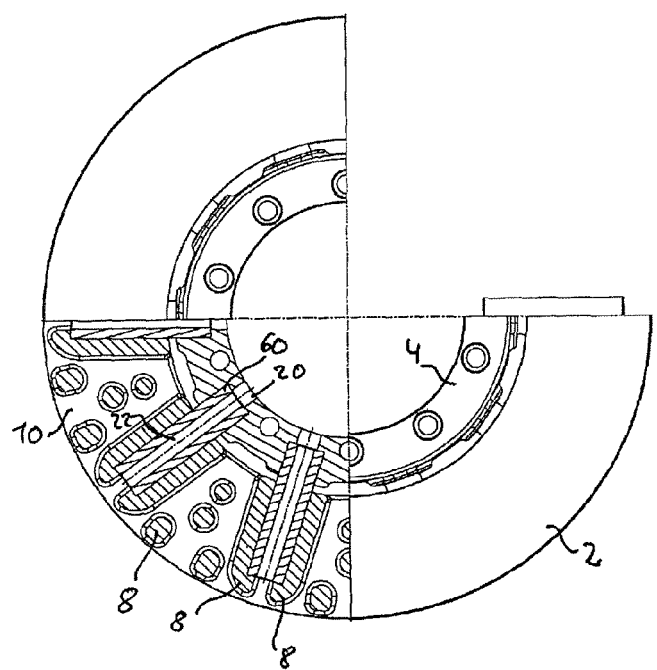
FIG. 8 is a cross-sectional side view of a further preferred embodiment of the brake disc arrangement according to the invention.

FIG. 8 depicts a further preferred exemplary embodiment of the brake disc arrangement according to the invention, wherein identical elements are denoted with the same reference signs. In contrast to the embodiment shown in FIG. 7, the connection element 60 in the area of the friction ring 2 is fully surrounded by material of the friction ring 2. To put it differently, in the area of a bar 8 of the friction ring 2, the connection element 60 is enclosed such that the area of the connection element arranged in the friction ring 2 is completely encased or surrounded by material of the friction ring 2. In the radial direction, however, the bar 8 is interrupted such that a ventilation of the connection element 60, which is designed as a hollow cylinder, is possible. Thus, the bar 8 may comprise a radial opening which essentially is aligned with the hollow space of the connection element 60 and, thus, allows for a ventilation from the outer circumference of the brake disc arrangement.

Figure 9:
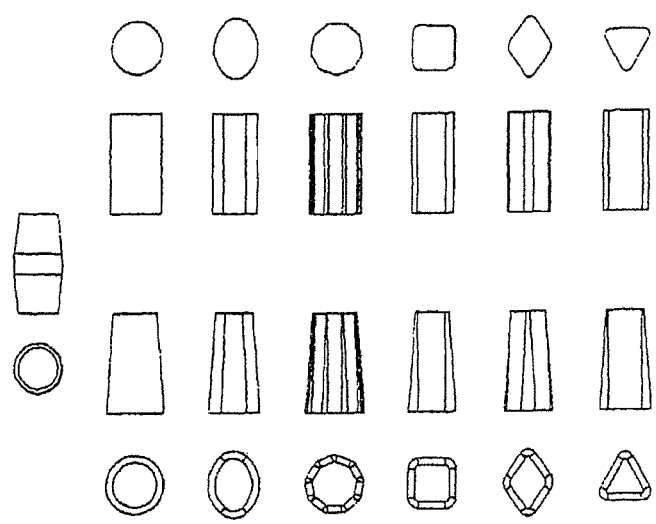
FIG. 9 is different top plan views and cross-sectional views of exemplary embodiments of the connection element according to the invention.

FIG. 9 depicts various variants of preferred exemplary embodiments of the connection element 6, 60 according to the invention. As can be seen, the connection element 6, 60 may be designed as a cylindrical body, whose cross-section perpendicular to its longitudinal axis Z remains essentially constant over the longitudinal extension. Here, the cross-section may be round, oval or circular. Alternatively, the cross-section may also be triangular, four-cornered, rhombic or polygonal.

In an alternative embodiment, the connection element 6, 60 may be designed tapered towards its second end 18, wherein the cross-sectional configurations mentioned at the beginning are also possible. Finally, the various variants may be combined with each other so that, for example, a connection element may be provided, both ends 16, 18 of which are tapered.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A brake disc arrangement for disc brakes, comprising:
a friction ring;
an attachment adapter for attaching the brake disc arrangement to a wheel hub; and
a connection element for connecting the friction ring and the attachment adapter, wherein the connection element includes an internally-located recess extending in a direction of a longitudinal axis of the connection element, the longitudinal axis of the connection element extending substantially perpendicular to an axis of rotation of the brake disc arrangement, wherein the recess includes a cross-sectional configuration that varies along the longitudinal axis of the connection element, the recess completely closed at a location along the longitudinal axis of the connection element, and wherein the recess of the connection element comprises one of two recesses which project into the connection element from two opposite end faces of the connection element;
wherein the attachment adapter comprises a fastening area in which the connection element is stationarily fixed, and wherein the friction ring comprises a receptacle area in which the connection element is accommodated such that the friction ring is radially movable relative to the connection element.

2. The brake disc arrangement according to claim 1, wherein the friction ring and the attachment adapter are arranged substantially concentrically to one another around the axis of rotation of the brake disc arrangement, and wherein the receptacle area of the friction ring and the fastening area of the attachment adapter are arranged substantially in a plane perpendicular to the axis of rotation of the brake disc arrangement.

3. The brake disc arrangement according to claim 1, wherein the connection element comprises an elongate body.

4. The brake disc arrangement according to claim 1, wherein the connection element at least partially comprises a cylindrical body, having a circular cross-section.

5. The brake disc arrangement according to claim 1, wherein the connection element at least partially comprises a body tapering towards the friction ring.

6. The brake disc arrangement according to claim 1, wherein the connection element comprises a hollow body.

7. The brake disc arrangement according to claim 1, wherein the recess ends in a bottom section of the connection element.

8. The brake disc arrangement according to claim 7, wherein the connection element is arranged such that the recess opens towards at least one of the friction ring and the attachment adapter.

9. The brake disc arrangement according to claims 7 and 8, wherein the bottom section is provided in that area of the connection element which corresponds to a gap existing between the friction ring and the attachment adapter, and wherein the bottom section at least partially overlaps with respective edge regions of the friction ring and the attachment adapter in the radial direction of the brake disc arrangement.

10. The brake disc arrangement according to claim 1, wherein the connection element is one of a plurality of connection elements spaced from one another.

11. A brake disc arrangement for disc brakes, comprising:
a friction ring;
an attachment adapter for attaching the brake disc arrangement to a wheel hub; and
a connection element for connecting the friction ring and the attachment adapter, wherein the connection element includes a recess extending in a direction of a longitudinal axis of the connection element, the longitudinal axis of the connection element extending substantially perpendicular to an axis of rotation of the brake disc arrangement, the recess completely closed at a location along the longitudinal axis of the connection element, and wherein the recess of the connection element comprises one of two recesses which project in the connection element from two opposite end faces of the connection element;
wherein the attachment adapter comprises a fastening area in which the connection element is stationarily fixed, and wherein the friction ring comprises a receptacle area in which the connection element is accommodated such that the friction ring is radially movable relative to the connection element.

12. The brake disc arrangement according to claim 11, wherein the connection element is one of a plurality of connection elements spaced from one another.

* * * * *